(12) United States Patent
Colette et al.

(10) Patent No.: US 6,507,162 B1
(45) Date of Patent: Jan. 14, 2003

(54) MOTOR FOR MOVING A FLAP OF A HEATING, VENTILATION AND/OR AIR CONDITIONING INSTALLATION OF A MOTOR VEHICLE, WITH IMPROVED CONTROL

(75) Inventors: Olivier Colette, Le Mesnil St Denis (FR); Pascal Guigou, Fontenay aux Roses (FR)

(73) Assignee: Valeo Corporation, La Verriere (FR)

( * ) Notice: Subject to any disclaimer, the term of this patent is extended or adjusted under 35 U.S.C. 154(b) by 0 days.

(21) Appl. No.: 09/695,419

(22) Filed: Oct. 25, 2000

(30) Foreign Application Priority Data

Oct. 27, 1999 (FR) .............................. 99 13452

(51) Int. Cl.⁷ .............................................. H02H 7/085
(52) U.S. Cl. ...................... 318/434; 318/471; 388/903; 388/934
(58) Field of Search ................................ 318/434, 471, 318/472, 473; 388/903, 909, 934; 361/103, 106; 310/68 C

(56) References Cited

U.S. PATENT DOCUMENTS

| 4,238,812 A | * | 12/1980 | Middleman et al. | ........ 361/106 |
| 4,878,001 A |   | 10/1989 | Hagikura et al. | |
| 5,010,264 A | * | 4/1991 | Yamada et al. | ................ 310/72 |
| 5,140,205 A | * | 8/1992 | Baines | ...................... 310/68 C |
| 5,294,852 A | * | 3/1994 | Straker | ...................... 310/68 C |

FOREIGN PATENT DOCUMENTS

| EP | 0150502 | 8/1985 |
| FR | 2749626 | 12/1997 |

\* cited by examiner

*Primary Examiner*—Bentsu Ro
(74) *Attorney, Agent, or Firm*—Liniak, Berenato & White

(57) ABSTRACT

A motor for moving a flap for distributing a flow of air in a duct of a heating, ventilation and/or air conditioning installation is supplied with voltage. A power-regulation module is mounted in series with the motor, and includes at least one positive-temperature-coefficient resistor, so that, when the flap reaches an open or closed position, the motor is blocked. This results in an increase in the current strength in the circuit, causing an increase in the value of the resistance, and this results in a reduction in the current strength and in the voltage at the terminals of the motor.

5 Claims, 2 Drawing Sheets

MOTOR FOR MOVING A FLAP OF A HEATING, VENTILATION AND/OR AIR CONDITIONING INSTALLATION OF A MOTOR VEHICLE, WITH IMPROVED CONTROL

FIELD OF THE INVENTION

The invention relates to a device for distributing a flow of air in a duct of an installation for heating, ventilating and/or air conditioning a passenger compartment.

BACKGROUND OF THE INVENTION

A device of this type generally comprises an electric motor capable of moving a distribution flap between a position for closing and a position for opening a duct of an installation of the abovementioned type.

The device further comprises a voltage source for electrically powering the motor. A control module, connected to the motor, usually regulates the electric power delivered for supplying the motor.

Such a control module, however, comprises a large number of components, including several active components, which complicate the structure of the module. Moreover, when the flap is immobile, especially in one of its open or closed positions, the control module cuts off the power supply to the motor. A set of electronic components is generally provided allowing time delaying of the duration of power supply when the control module cuts off the power supply to the motor, the flap having reached one of its opening or closing positions. Such time-delay electronics further encumber the structure of the known control modules.

The present invention aims to improve the situation.

According to the present invention there is provided a device for distributing a flow of air in at least one duct of an installation for heating, ventilating and/or air conditioning the passenger compartment of a motor vehicle, comprising:
  a flap suitable for being moved between a position for closing and a position for opening the duct,
  an electric motor for moving the flap,
  a voltage-supply source, and
  a power-regulation module,
  wherein the power-regulation module comprises a first terminal connected to a first terminal of the motor, wherein the power-supply voltage is suitable for being applied between a second terminal of the regulation module and the second terminal of the motor, and wherein that the regulation module is configured so as to adjust the strength of the current passing through the motor, at substantially constant power-supply voltage, to a value below a threshold value when the flap is immobile.

Hence, the motor of the device according to the invention can be supplied with voltage permanently, which makes it possible to dispense with time-delay electronics of the type described above.

Advantageously, the regulation module is formed by at least one passive two-pole, preferably a positive-temperature-coefficient resistor.

According to another advantageous, optional characteristic of the invention, the power-supply source is configured to deliver a polarized voltage, and the regulation module includes a change-over circuit suitable for supplying the motor with a current which is a function of the polarity of the power-supply voltage.

Hence, in one preferred embodiment of the invention, the regulation module includes two positive-temperature-coefficient resistors, mounted in parallel and connected respectively to first and second diodes, inverted and each mounted in series with a resistor.

Advantageously, the polarity of the power-supply voltage delivered is:
  of a first sign when the flap is in its closed position and/or in motion from its open position to its closed position, and
  of a second sign, opposite to the first sign, when the flap is in its open position and/or in motion from its closed position to its open position.

In one advantageous embodiment of the invention, the regulation module and the motor, when the vehicle is in service, are supplied with a voltage which is substantially constant, at least in absolute value, and the regulation module is configured to adjust the strength of the current passing through the motor to a value below the abovementioned threshold value, when the flap is in one of its open and closed positions. dr

BRIEF DESCRIPTION OF THE DRAWINGS

Other advantages and characteristics of the invention will emerge on examining the detailed description below, and the attached drawings, in which.

DESCRIPTION OF THE PREFERRED EMBODIMENT

Figure 1:
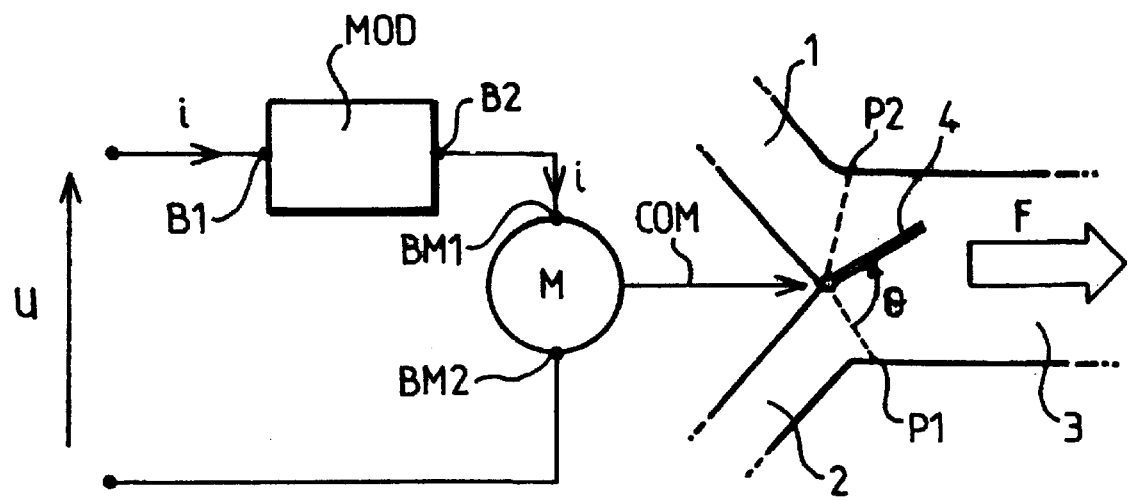
FIG. 1 represents an overall view of a device according to the invention, including a flap 4 for distributing an air flow F in a duct of an installation for heating, ventilating and/or air conditioning the passenger compartment of a motor vehicle.

The detailed description below and the attached drawings contain, in essence, elements of a certain character. They could not only serve to give a better understanding of the present invention, but could also contribute to its definition, as the case may be.

In the various figures, like reference numerals refer to like parts.

Referring first of all to FIG. 1, a device is described for distributing a flow of air (arrow F) in a duct 3 of an installation for heating, ventilating and/or air conditioning the passenger compartment of a motor vehicle, according to one preferred embodiment of the present invention.

Such a device includes a flap 4, configured so as to move in rotation along an angular travel e, between a position for opening and closing one of the ducts 1 and 2. The flap 4 is, in the example described, a flap for recirculating air in the passenger compartment of the vehicle.

Referring to FIG. 1, an outside-air duct 1 and a recirculated-air duct 2 join together in a main duct 3 intended to supply the passenger compartment of the motor vehicle with blown air. When the duct 4 is in its open position P1, the outside-air duct 1 communicates directly with the main duct 3, and outside air is admitted into the passenger compartment. In contrast, when the flap 4 is in its closed position P2, the outside-air duct 1 is closed, while the recirculated-air duct 2 is open, which makes it possible to blow recirculated air into the passenger compartment.

In practice, the outside-air flow originating from the duct 1 is markedly greater than the recirculated-air flow originating from the duct 2. An intermediate position of the flap 4, between its positions P1 and P2, would amount to admitting practically only outside air into the duct 3. Hence a recirculation flap generally remains immobile only in one of its open P1 or closed P2 positions, and the air blown into the passenger compartment is either outside air or recirculated air.

A motor M moves the flap 4 (arrow COM) between the two positions P1 and P2. Moreover, a module MOD for regulating the power supply to the motor M is connected in series, via its terminal B2, to the terminal BM1 of the motor M. The assembly formed by the motor M and the module MOD is supplied with voltage U. The voltage U is then applied between the respective terminals B1 and BM2 of the module MOD and of the motor M. In practice, this power-supply voltage U is delivered by a voltage source, such as the battery of the vehicle.

Figure 3:
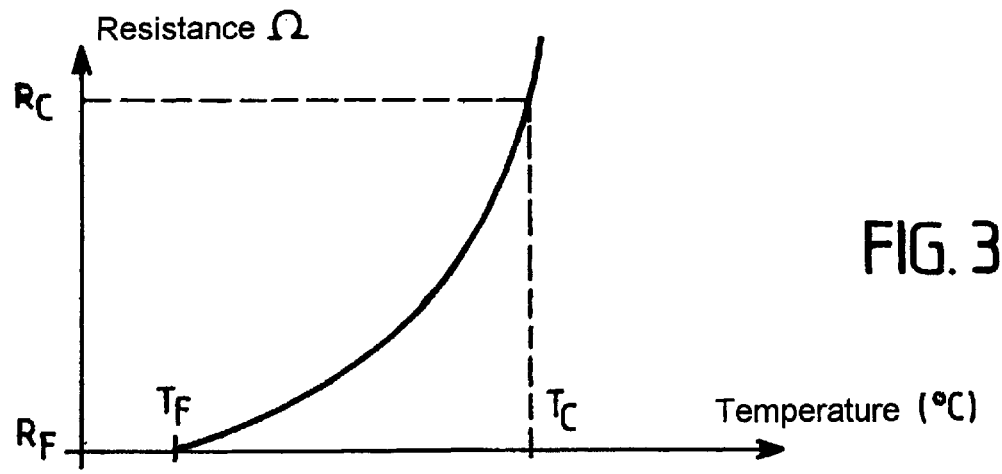
FIG. 3 diagrammatically represents a variation in the ohmic value of a positive-temperature-coefficient resistor, as a function of its temperature, such a resistor being used in the electrical circuit of the regulation module of FIG. 2.

In one preferred embodiment of the regulation module of the device according to the invention, this module MOD includes at least one positive-temperature-coefficient resistor R. Referring to FIG. 3, the ohmic value of such a resistor increases with its temperature.

Figure 4A:
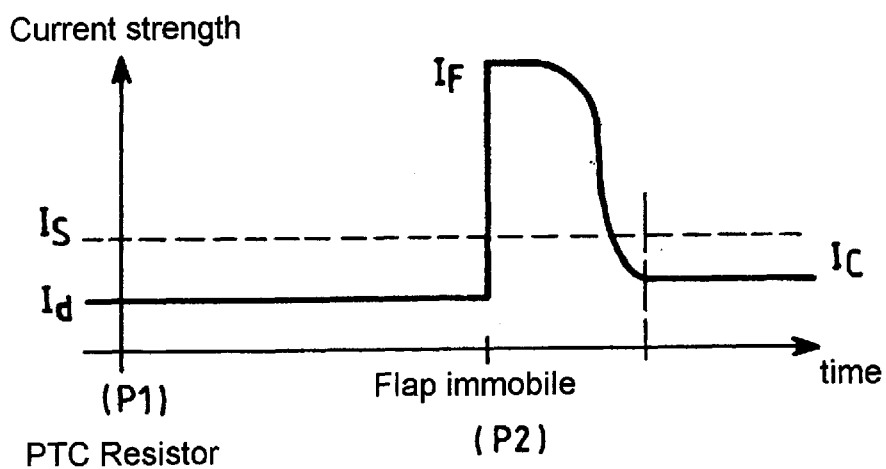
FIG. 4A diagrammatically represents the time-based profile of the strength of current i which passes through the motor M, when the flap 4 passes from an open position to a closed position P2.

Referring to FIG. 4a, when the flap moves, the strength of current $i_d$ which passes through the module MOD and the motor M, in series, is typically given by:

$$id=(U-E)/(r+R_F)$$

where E is the back EMF of the motor, r corresponds to the internal resistance of the motor and $R_F$ corresponds to the ohmic value of the resistor R when cold.

When the flap 4 reaches one of its positions P1 or P2, the motor is blocked and the speed of its rotor is cancelled. There follows a cancellation of the back EMF E and an abrupt increase in the current, the strength of which becomes:

$$iF=U/(R_F+r).$$

This latter value of the current strength is, clearly, greater than the current strength $i_d$ which usually passes through the motor when the flap 4 is moving.

Figure 4B:
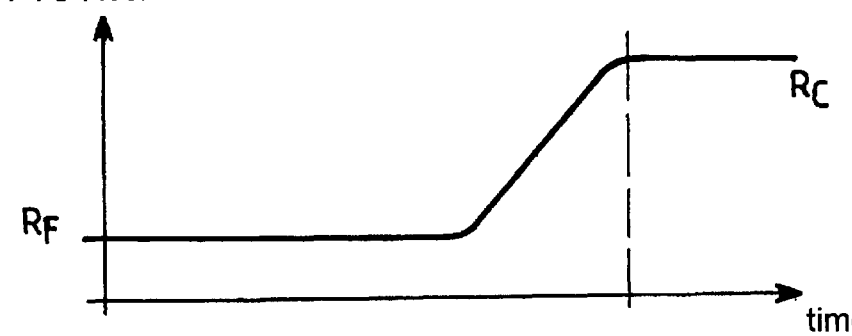
FIG. 4B diagrammatically represents the time-based profile of the ohmic value of one of the resistors R1 and R2 of FIG. 2, when the flap 4 passes from an open position P1 to a closed position P2.

The resistor R of the module MOD, with positive temperature coefficient, is mounted in series with the motor M. It is therefore subjected to this increase in the current strength i. The resistor R then gives off heat by Joule effect and its temperature increases. Referring to FIG. 3, the ohmic value of the resistor R then increases exponentially with temperature. Hence, when the motor M is blocked, the ohmic value of the resistor R increases considerably (FIG. 4B), typically by a factor close to a few tens. Its ohmic value changes from a value $R_F$ (when cold) to a value $R_C$ (when hot), with:

$$R_C>>R_F$$

The current in the circuit drops and becomes:

$$i_C=U/(R_C+r)$$

Referring to FIG. 4A, when the motor is blocked for a sufficient period of time, the current strength i stabilizes at a low value, below a threshold value $i_s$. This threshold value $i_s$ can be fixed at a value lying between $i_F$ and $i_C$.

The voltage $U_C$ at the terminals of the motor, for its part, becomes close to:

$$U_c=U-R_c i_c \ (<<U)$$

Figure 4C:
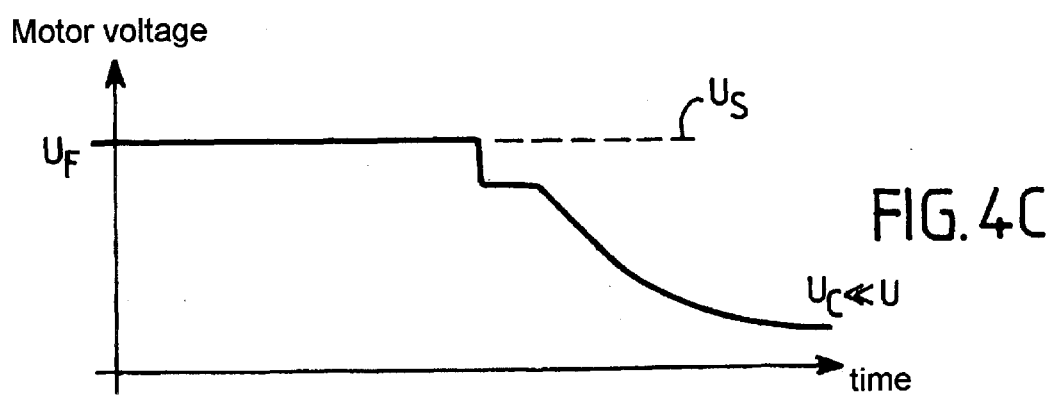
FIG. 4C diagrammatically represents the time-based profile of the voltage at the terminals of the motor $U_M$, when the flap 4 passes from an open position P1 to a closed position P2.

Referring to FIG. 4C, the value of this voltage is, on the one hand, markedly less than the value of the power-supply voltage U and, on the other hand, less than the voltage $U_F$ of the motor when the flap moves, defining a threshold value $U_S$, as the case may be (FIG. 4C). Thus the power supplied to the motor when the flap is immobile is limited.

Thus, according to one of the major advantages which the present invention confers, regulation of the motor M, in terms of power, is obtained as a function of the movement of the flap 4.

In order to obtain such a regulation, a simple positive-temperature-coefficient resistor is sufficient, according to another advantage which the present invention confers. The regulation module MOD, including such a resistor, can then take the form of a passive dipole, without necessarily comprising active electronic components, such as operational amplifiers or transistors.

However, when the flap 4 is blocked in one of its positions P1 or P2, the resistor R is hot, and it is necessary to wait until it cools down in order to deliver sufficient current and voltage at the terminals of the motor and, that being so, sufficient torque to move the flap 4 to its other position P2 or P1.

Figure 2:
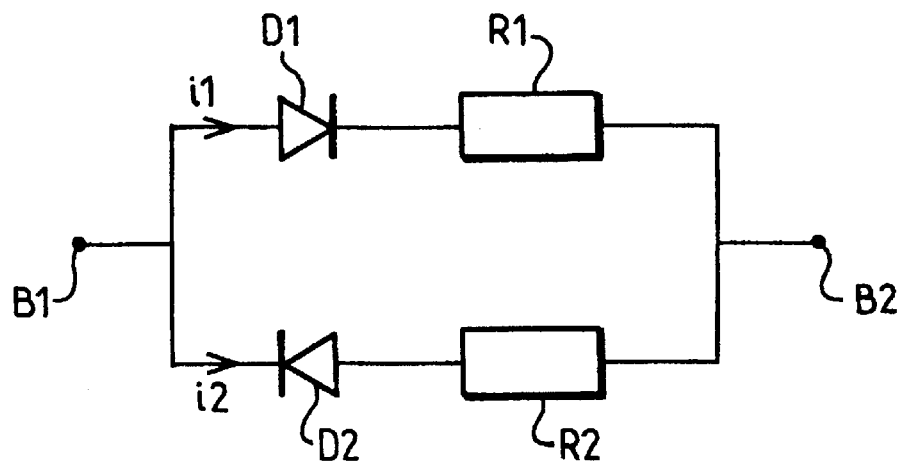
FIG. 2 diagrammatically represents the electrical circuit of a module for varying the electrical power supply to the motor M of the device, according to a preferred embodiment of the present invention.

Referring to FIG. 2, a preferred embodiment is described of the regulation module MOD of a device according to the invention. The module, between its two terminals B1 and B2, comprises two positive-temperature-coefficient resistors R1 and R2, mounted in parallel. These resistors R1 and R2 are connected in series with two inverted diodes D1 and D2, respectively. Such a layout, in change-over circuit mode, of the regulation module MOD, in combination with a polarized power-supply voltage, advantageously makes it possible instantaneously to cause the movement of the flap 4, following a blocking of the motor M.

For example, when the polarity of the voltage U is positive (U=+|U|), the strength of current at the terminals of the motor corresponds to i1, whereas i2 is zero (diode D1 conducting and diode D2 turned off).

In contrast, when the polarity of the power-supply voltage U is negative (U=−|U|), the strength of current which passes through the motor M corresponds to i2, while the current i1 is zero (diode D2 conducting and diode D1 turned off).

These two polarity states of the voltage U make it possible, nearly instantaneously, to obtain opposite directions of rotation of the flap 4.

Clearly, the present invention is not limited to the embodiment described above by way of example. It extends to other variants.

Thus, it will be understood that the flap 4 may be a mixing flap for heating the passenger compartment, or even a flap for distributing a flow of air feeding the passenger compartment (ventilation for the windscreen, for the central air vents and for the "feet" air vents)

Although advantageous, the use of positive-temperature-coefficient resistors is described above by way of example of a preferred embodiment of the present invention. In a variant, active electronic components may be provided, capable of regulating the strength of the current which passes through the motor M as a function of its blocked or active state. In this case, intermediate positions of the flap may be provided for, between its open and closed position, in such a way that, when the flap is immobile, the strength of the current which passes through it falls to a value below a threshold value $i_s$, while, when the flap is moving, the strength of the current $i_d$ which passes through it is higher than this threshold value.

In one simplified variant of the device according to the invention, only a single positive-temperature-coefficient resistor may be provided. In this case, between each movement of the flap 4 from one of its positions to the other, it is necessary to wait until the resistor R cools down. Thus, this simplified embodiment is suitable for certain flap controls (for example for air recirculation in the passenger compartment), which do not require rapid to-and-fro movements of such flaps.

The polarity of the power-supply voltage, particularly advantageous in the embodiment of the regulation module with two resistors R1 and R2 in a change-over circuit, may, especially in the simplified variant above, be dispensed with.

What we claim is:

1. A device for distributing a flow of air in at least one duct of an installation for heating, ventilating and/or air conditioning the passenger compartment of a motor vehicle, having:

a flap suitable for being moved between a position for closing and a position for opening the duct, an electric motor for moving the flap, a voltage-supply source, and a power-regulation module, wherein the power-regulation module comprises a first terminal connected to a first terminal of the motor, wherein the voltage-supply source is suitable for being applied between a second terminal of the regulation module and the second terminal of the motor, and wherein that the regulation module is configured so as to adjust the strength of the current passing through the motor, at substantially constant voltage-supply source, to a value below a threshold value when the flap is immobile, and wherein the voltage-supply source is configured to deliver a polar voltage, and wherein the regulation module includes a changeover circuit suitable for supplying the motor with a current which is a function of the polarity of the voltage-supply source, and wherein the regulation module includes first and second positive-temperature-coefficient resistors, mounted in parallel and connected respectively to first and second diodes, inverted and each mounted in series with the resistors.

2. The device of claim 1, wherein the regulation module is formed by at least one passive two-pole.

3. The device of claim 1, wherein the polarity of the voltage-supply source delivered is:

of a first sign when the flap is in its closed position and/or in motion from its open position to its closed position, and of a second sign, opposite to the first sign, when the flap is in its open position and/or in motion from its closed position to its open position.

4. The device of claim 1, wherein the regulation module and the motor, in use, are supplied with a voltage which is substantially constant, at least in absolute value, and wherein the regulation module is configured to adjust both the voltage and the strength of the current at the terminals of the motor to values below threshold values, when the flap is immobile.

5. The device of claim 1, wherein the flap is immobile only in the open and closed positions.

* * * * *

UNITED STATES PATENT AND TRADEMARK OFFICE
CERTIFICATE OF CORRECTION

PATENT NO.    : 6,507,162 B1
DATED         : January 14, 2003
INVENTOR(S)   : Colette et al.

It is certified that error appears in the above-identified patent and that said Letters Patent is hereby corrected as shown below:

<u>Title page,</u>
Item [73], should read: -- [73]   Assignee:  Valeo Corporation La Verriere (FR)

Signed and Sealed this

Tenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,507,162 B1
DATED          : January 14, 2003
INVENTOR(S)    : Colette et al.

It is certified that error appears in the above-identified patent and that said Letters Patent is hereby corrected as shown below:

<u>Title page,</u>
Item [73], should read: -- [73]    Assignee:  Valeo Climatisation La Verriere (FR) --

This certificate supersedes Certificate of Correction issued June 10, 2003.

Signed and Sealed this

Twenty-second Day of July, 2003

JAMES E. ROGAN
*Director of the United States Patent and Trademark Office*